G. HUHNDORF & T. J. HOLYCROSS.
AUTOMATIC ENGINE STOP.
APPLICATION FILED JUNE 28, 1917.
1,253,977.
Patented Jan. 15, 1918.
2 SHEETS—SHEET 1.
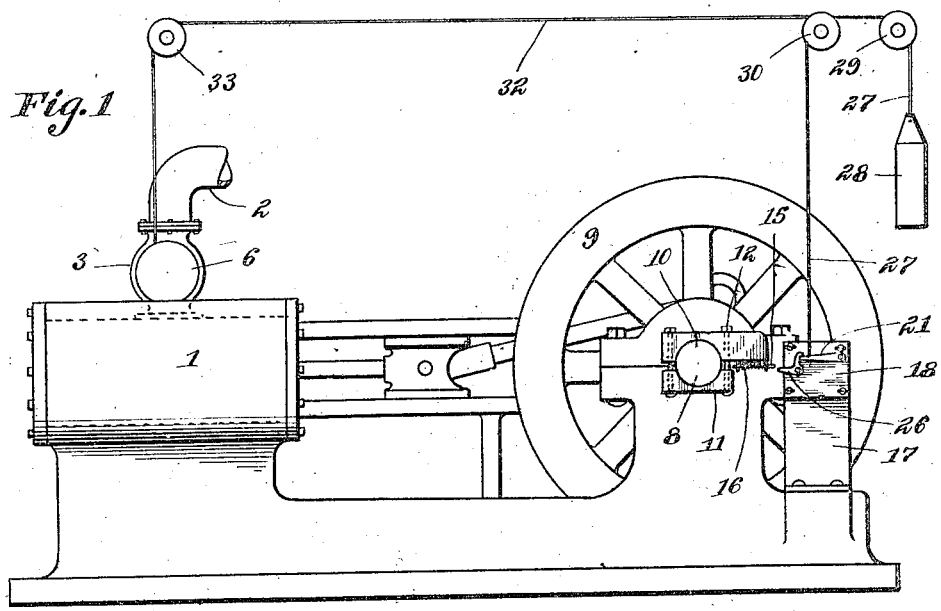
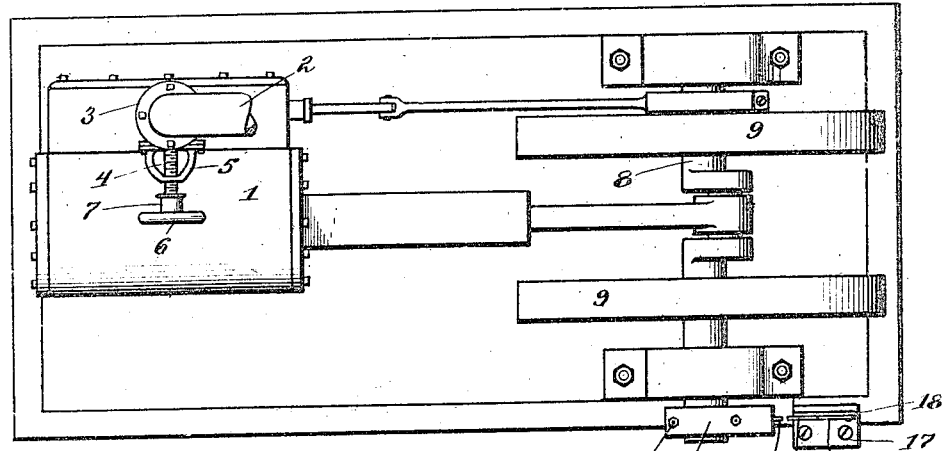

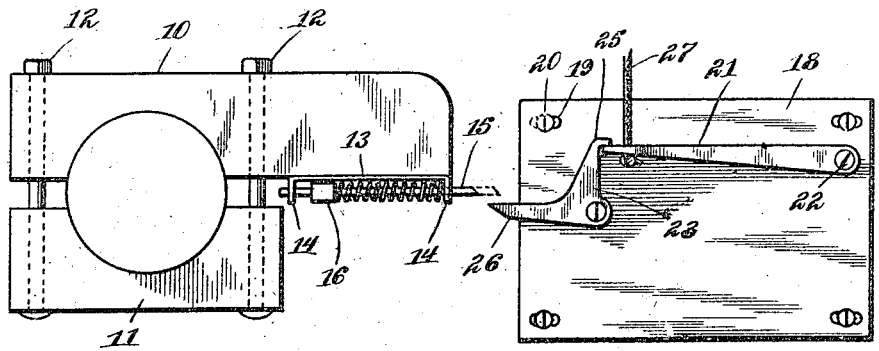
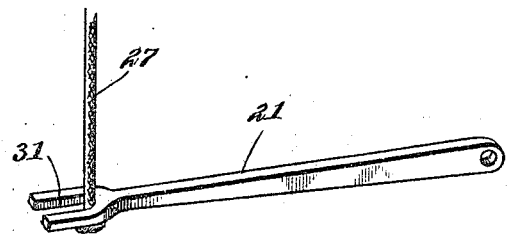
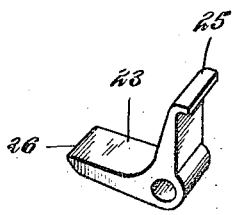

UNITED STATES PATENT OFFICE.

GUSTAVE HUHNDORF, OF TONO, AND THOMAS J. HOLYCROSS, OF VADER, WASHINGTON.

AUTOMATIC ENGINE-STOP.

1,253,977. Specification of Letters Patent. Patented Jan. 15, 1918.

Application filed June 28, 1917. Serial No. 177,616.

*To all whom it may concern:*

Be it known that we, GUSTAVE HUHNDORF, residing at Tono, in the county of Thurston and State of Washington, and THOMAS J. HOLYCROSS, residing at Vader, in the county of Lewis and State of Washington, both citizens of the United States, have invented new and useful Improvements in Automatic Engine-Stops, of which the following is a specification.

This invention relates to emergency stop mechanism for engines and comprehends the provision of an automatic stop which will operate when the engine runs beyond a predetermined speed to close the throttle valve, thus stopping the engine.

One of the objects of the invention is to provide a simple and practical stop which may be easily installed on any engine and which will act as a safety device to stop the engine should it begin to race or run above a desired speed.

Another and more specific object of the invention resides in the provision of a centrifugally operated trip rod, actuated by the engine when running beyond a desired speed to trip a latch which will throw a weight into operation to close the throttle valve.

The invention also aims to generally improve automatic stop mechanism of this nature to render it more practical, reliable and commercially desirable.

With these and other objects in view as will become more apparent as the description proceeds, the invention consists in certain novel features of construction, combination and arrangement of parts as will be hereinafter fully described, illustrated and claimed.

In the drawings,

Figure 1 is a side elevation showing the application of our invention to a stationary steam engine.

Fig. 2 is a top plan view.

Fig. 3 is an enlarged detail view of the trip rod and the mechanism operated thereby.

Fig. 4 is a detail perspective view of the lever showing the slot formed in the end thereof, and Fig. 5 is a view of parts to be hereinafter fully described.

Referring in detail to the drawings by numerals, 1 designates the cylinder of a steam engine to which steam is fed through the pipe 2 past the throttle valve 3. The valve is actuated by a threaded valve rod 4 working through a bracket 5 and having an end wheel 6 secured to its outer end for manually opening or closing the valve.

In carrying out our invention, we provide the valve rod with a sheave or pulley 7 which is fixed to the rod so as to rotate therewith.

The crank shaft 8 carries the customary fly wheel 9 and to this shaft, we secure a trip head or support consisting of the blocks 10 and 11 which are secured to the shafts by the bolts 12. The block 10 extends radially beyond one end of the block 11 and carries on its extended portion a bracket plate 13 having a pair of laterally projecting ears 14 formed adjacent its terminals.

A trip rod 15 slides longitudinally through the ears 14 and carries a weight 16. An expansive helical spring encircles the rod between the weight and the outermost ear 14 and tends to hold the rod normally in a retracted position.

On a suitable support 17, we adjustably secure a rectangular latch plate 18 having longitudinal slots 19 through which extend fasteners 20. A lever 21 is pivotally secured at one end by the fastener 22 to the latch plate and is engaged at its free end and held against upward movement by a latch 23 pivotally mounted to the latch plate 24 and having a hook shaped arm 25 which engages over the end of the lever. The trip arm 26 of the latch extends at substantially right angles to the hook arm 25 toward the shaft 8 of the engine.

A rope or flexible connection 27 is secured at one end to a weight 28, trained over the pulleys 29 and 30 and extended through the notch in the terminal of the lever 21 and notch as at 31 to prevent retractive slippage through the notch between the side walls thereof when the lever is engaged by the latch 26. A second rope or flexible connection 32 is connected to the rope 27, passed over the pulley 33, around the sheave 7 for several turns and secured at its end to said sheave.

In operation when the engine exceeds a predetermined speed, the trip rod 15 will be moved outwardly by centrifugal force to trip the latch 26 and free the lever 21. The weight 28 will then descend swinging the lever upwardly and disconnecting the rope 27 therefrom. As the weight descends, it will rotate the sheave or pulley 7 causing the throttle valve to close and cut off the steam from the engine cylinder. The latch plate 18 may be adjusted longitudinally toward or away from the path of the trip rod 15 to determine the speed at which the engine will be stopped. It will be noted, that since the rope 27 is automatically detached from the lever 21, when the latter is freed, that the weight 28 will be unhindered in its descent and may be moved downwardly until it reaches the floor at which time the throttle valve will be entirely closed.

While we have shown and described the preferred embodiment of our invention, it will be clearly understood that we do not wish to be limited to this construction, but may make such changes as will fall within the scope and spirit of the invention as claimed.

What we claim is:

An automatic engine stop, embodying in combination, a supporting plate adjustably mounted for movement toward and away from the engine shaft, a weight operated throttle valve closing flexible connection, a horizontally disposed lever pivotally mounted at one end on said supporting plate with its free end extending toward the engine shaft and having said flexible connection detachably held thereby, a bell crank latch also pivotally mounted on said supporting plate with one arm in engagement with the free end of said lever and the other arm extended toward the engine shaft, and a centrifugally operated trip on the engine shaft adapted to contact with the last named arm of the lever when the engine shaft reaches a predetermined maximum speed.

In testimony whereof we affix our signatures.

GUSTAVE HUHNDORF.
THOMAS J. HOLYCROSS.